United States Patent
Zadikian et al.

(10) Patent No.: US 8,762,568 B1
(45) Date of Patent: *Jun. 24, 2014

(54) METHOD AND APPARATUS FOR INTER-ZONE RESTORATION

(75) Inventors: H. Michael Zadikian, McKinney, TX (US); Zareh Baghdasarian, La Canada, CA (US); Ali N. Saleh, Ft. Lauderdale, FL (US); Vahid Parsi, Sherman Oaks, CA (US)

(73) Assignee: Cisco Technology, Inc., San Jose, CA (US)

( * ) Notice: Subject to any disclaimer, the term of this patent is extended or adjusted under 35 U.S.C. 154(b) by 1798 days.

This patent is subject to a terminal disclaimer.

(21) Appl. No.: 09/899,962

(22) Filed: Jul. 6, 2001

(51) Int. Cl.
  *G06F 15/173* (2006.01)

(52) U.S. Cl.
  USPC ........... 709/239; 709/238; 709/240; 370/216; 370/238; 370/254

(58) Field of Classification Search
  USPC ................. 370/355, 354; 709/239, 238, 240
  See application file for complete search history.

(56) References Cited

U.S. PATENT DOCUMENTS

| | | | | |
|---|---|---|---|---|
| 4,701,756 A | * | 10/1987 | Burr | 340/2.81 |
| 4,993,015 A | | 2/1991 | Fite, Jr. | 370/16 |
| 5,065,399 A | | 11/1991 | Hasegawa et al. | |
| 5,235,599 A | * | 8/1993 | Nishimura et al. | 714/4.21 |
| 5,444,693 A | * | 8/1995 | Arslan et al. | 370/221 |
| 5,513,345 A | | 4/1996 | Sato et al. | |
| 5,748,611 A | | 5/1998 | Allen et al. | |
| 5,832,197 A | * | 11/1998 | Houji | 714/4 |
| 5,848,055 A | * | 12/1998 | Fedyk et al. | 370/228 |
| 5,859,959 A | * | 1/1999 | Kimball et al. | 714/4.4 |
| 5,881,048 A | | 3/1999 | Croslin | |
| 5,887,127 A | * | 3/1999 | Saito et al. | 714/4.1 |
| 5,933,422 A | * | 8/1999 | Kusano et al. | 370/331 |
| 5,933,425 A | | 8/1999 | Iwata | |
| 5,959,972 A | | 9/1999 | Hamami | |
| 6,026,077 A | * | 2/2000 | Iwata | 370/254 |
| 6,075,766 A | | 6/2000 | Croslin | |
| 6,115,753 A | * | 9/2000 | Joens | 709/242 |
| 6,141,325 A | * | 10/2000 | Gerstel | 370/238 |
| 6,163,525 A | | 12/2000 | Bentall et al. | |
| 6,167,025 A | * | 12/2000 | Hsing et al. | 370/216 |
| 6,222,820 B1 | | 4/2001 | Hamami | |
| 6,229,787 B1 | | 5/2001 | Byrne | |
| 6,246,689 B1 | * | 6/2001 | Shavitt | 370/406 |
| 6,282,170 B1 | | 8/2001 | Bentall et al. | |
| 6,324,162 B1 | | 11/2001 | Chaudhuri | |
| 6,377,543 B1 | * | 4/2002 | Grover et al. | 370/227 |
| 6,392,989 B1 | * | 5/2002 | Jardetzky et al. | 370/216 |
| 6,418,139 B1 | * | 7/2002 | Akhtar | 370/356 |
| 6,430,150 B1 | | 8/2002 | Azuma et al. | |

(Continued)

OTHER PUBLICATIONS

Wikipedia, Dijkstra's algorithm, pp. 1-7.*

*Primary Examiner* — Backhean Tiv
(74) *Attorney, Agent, or Firm* — Campbell Stephenson LLP

(57) ABSTRACT

A method and system is provided to reduce the time to restore links in a communication system. The method and system employ a preplanned backbone zone to eliminate downtime searches for alternate paths. Efficient use of restoration techniques assures that inter-zone routes are properly allocated. Alternate paths are chosen by calculating shortest paths from a root node to a target node. The shortest paths are placed in a table for lookup whenever a communication failure occurs. Considerations as to cost and length are taken into account in determining the alternative routes.

40 Claims, 7 Drawing Sheets

(56) References Cited

U.S. PATENT DOCUMENTS

| | | | |
|---|---|---|---|
| 6,493,317 B1 | 12/2002 | Ma | |
| 6,646,989 B1* | 11/2003 | Khotimsky et al. | 370/238 |
| 6,697,325 B1* | 2/2004 | Cain | 370/217 |
| 6,708,209 B1* | 3/2004 | Ebata et al. | 709/223 |
| 6,751,190 B1 | 6/2004 | Swallow | 370/217 |
| 6,760,777 B1* | 7/2004 | Agarwal et al. | 709/238 |
| 6,778,492 B2 | 8/2004 | Charny et al. | 370/228 |
| 6,801,496 B1 | 10/2004 | Saleh et al. | |
| 6,832,258 B1* | 12/2004 | Oman | 709/229 |
| 6,856,627 B2 | 2/2005 | Saleh et al. | |
| 6,857,026 B1* | 2/2005 | Cain | 709/239 |
| 6,973,033 B1* | 12/2005 | Chiu et al. | 370/230.1 |
| 6,981,065 B1* | 12/2005 | Lu | 709/251 |
| 7,035,937 B2* | 4/2006 | Haas et al. | 709/239 |
| 7,188,280 B2* | 3/2007 | Shinomiya et al. | 714/43 |
| 7,200,104 B2 | 4/2007 | Saleh et al. | |
| 7,349,326 B1 | 3/2008 | Zadikian et al. | |
| 7,411,964 B2* | 8/2008 | Suemura | 370/400 |
| 7,424,035 B2* | 9/2008 | Saleh et al. | 370/468 |
| 8,537,836 B2* | 9/2013 | Saleh et al. | 370/397 |
| 2001/0034853 A1* | 10/2001 | Takatama et al. | 714/4 |
| 2001/0048660 A1* | 12/2001 | Saleh et al. | 370/216 |
| 2002/0131362 A1* | 9/2002 | Callon | 370/216 |
| 2002/0131424 A1* | 9/2002 | Suemura | 370/400 |
| 2002/0141378 A1* | 10/2002 | Bays et al. | 370/351 |
| 2004/0073700 A1* | 4/2004 | Chaudhuri | 709/239 |
| 2006/0153066 A1* | 7/2006 | Saleh et al. | 370/216 |
| 2007/0153700 A1* | 7/2007 | Spalink et al. | 370/238 |
| 2008/0225696 A1* | 9/2008 | Saleh et al. | 370/216 |
| 2009/0074404 A1* | 3/2009 | Suryaputra et al. | 398/5 |
| 2012/0076492 A1* | 3/2012 | Saleh et al. | 398/25 |

* cited by examiner

METHOD AND APPARATUS FOR INTER-ZONE RESTORATION

CROSS-REFERENCES TO RELATED APPLICATIONS

This application relates to the following commonly assigned applications:

1. Patent application Ser. No. 09/751,763; filed Dec. 30, 2001, entitled, "A METHOD FOR ROUTING INFORMATION OVER A NETWORK EMPLOYING CENTRALIZED CONTROL," now U.S. Pat. No. 6,973,023, issued Dec. 6, 2005).

2. Patent application Ser. No. 09/859,166; filed May 16, 2001, entitled, "A METHOD FOR RESTORING A VIRTUAL PATH IN AN OPTICAL NETWORK USING 1+1 PROTECTION".

The above mentioned applications are assigned to Cisco Technology, Inc., the assignee of the present invention, and are hereby incorporated by reference in their entirety and for all purposes.

BACKGROUND OF THE INVENTION

1. Field of the Invention

This invention relates to the field of communication networks, in particular to a method and apparatus to re-establish communication links after communication links experience a failure.

2. Description of the Related Art

Today's networks carry vast amounts of information. High bandwidth applications supported by these networks include streaming video, streaming audio, and large aggregations of voice traffic. In the future, these bandwidth demands are certain to increase. To meet such demands, an increasingly popular alternative is the use of light wave communications carried over fiber-optic cables. The use of light wave communications provides several benefits, including high bandwidth, ease of installation, and capacity for future growth.

Optical infrastructures are capable of transmission speeds in the gigabit range, which helps address the ever-increasing need for bandwidth mentioned above. Such infrastructures employ various topologies, including ring and mesh topologies. In order to provide fault protection, ring topologies normally reserve a large portion (e.g., 50% or more) of the network's available bandwidth for use in restoring failed circuits. However, ring topologies are capable of quickly restoring failed circuits. This capability is important in providing reliable service to customers, and is particularly important in telephony applications, where a failure can result in alarms, dropped calls, and, ultimately, customer dissatisfaction and lost revenue. In a similar vein, because of bandwidth demands, protocol overhead related to provisioning, restoration, and other functions should be kept to a minimum in order to make the maximum amount of bandwidth available for use by customers.

An alternative to the ring topology, the mesh topology reduces the amount of bandwidth needed for protection. The mesh topology is a point-to-point topology, with each node in the network connected to one or more other nodes. Because a circuit may be routed through various combinations of the network's nodes and over the various links which connect them, excess capacity through a given node or over a given link can serve to protect several circuits. The restoration of a circuit following a failure in a mesh topology can consume a relatively large amount of time.

Therefore, there is the tradeoff in ring topologies that can restore communication quickly but take up a great deal of bandwidth, and mesh topologies that do not take up as much bandwidth but are much slower in restoring communications. Current communication networks provide continuous, and as users have become accustomed to, uninterrupted transmission. A need therefore has been felt for a method and apparatus that allows for rapid restoration of communication in the event of the failure of a link.

SUMMARY OF THE INVENTION

What is needed and is disclosed herein is an invention that provides for restoration of paths between zones, where the zones include a number of nodes. A zone can have a source node or the zone can have a destination node. Border nodes connect to other border nodes of other zones. The zones connected with one another make up a higher hierarchical zone referred to herein as a backbone zone.

In some embodiments, in order to reduce the time to restoration of failed links between a source and a destination node, a determination is made as to alternative routes that may exist between nodes. Some embodiments can employ metrics such as class of service, which are used to determine the allocation of resources (i.e. links, bandwidth, or the like) between source and destination nodes. Further, the backbone zone can be preplanned which provides further reduction of the time of restoration of failed links.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features and advantages made apparent to those skilled in the art by referencing the accompanying drawings. The use of the same reference number throughout the figures designates a like or similar element.

Figure 1:
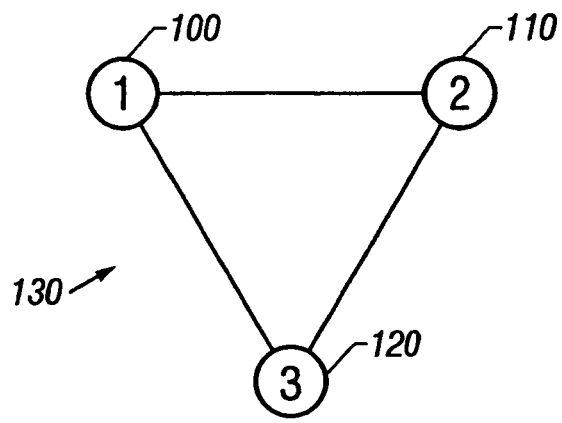
FIG. 1 illustrates a backbone zone.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the scope of the present invention as defined by the appended claims.

DETAILED DESCRIPTION

A topology database can be used to provide information to nodes in a network regarding connectivity of those nodes to other of those nodes and zones. Broadcast packets are sent by nodes whenever a failure occurs, effectively requesting the availability of other nodes to connect and establish a communication path. To limit the size of the topology database and the scope of broadcast packets, networks employing the protocol described herein can be divided into smaller logical groups called "zones." Each zone executes a separate copy of the topology distribution algorithm, and typically nodes within each zone are only required to maintain information about their own zone. There is no need for a zone's topology to be known outside that zone's boundaries, and nodes within a zone need not be aware of the network's topology external to their respective zones. A network includes a number of nodes.

Nodes that attach to multiple zones are referred to herein as border nodes. Each zone has at least one border node, and that border node is coupled to at least one other border node of another zone. Border nodes are typically required to maintain a separate topological database, also called link-state or connectivity database, for each of the zones to which they are attached. Border nodes use the connectivity database for intra-zone routing. Border nodes are also required to maintain a separate database that describes the connectivity of the zones themselves. This database, which is referred to herein as the network database, is used for inter-zone routing. The network database describes the topology of a special zone, referred to herein as the backbone zone. In certain embodiments, the backbone zone is always assigned a hierarchical identification (ID) of 0. The backbone has the characteristics of a zone. There is no need for a backbone's topology to be known outside the backbone, and a zone's border nodes need not be aware of the topologies of other zones.

FIG. 1 is a block diagram illustrating a topology of a backbone zone. A zone 100 (also referred to as Zone 1) directly connects to a zone 110 (Zone 2). A zone 120 (Zone 3) is connected to zone 100 (Zone 1) and zone 110 (Zone 2). Zone 120 (Zone 3) indirectly connects zone 100 (Zone 1) and zone 2 (Zone 110). In this particular example, the backbone zone 130 is referred to as Zone 0.

Figure 2:
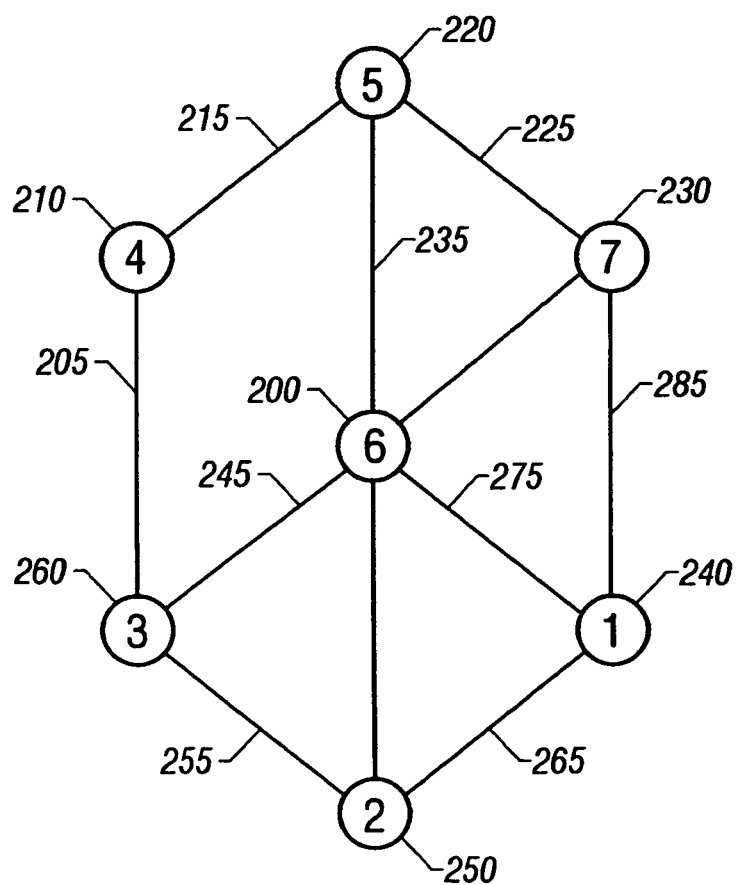
FIG. 2 illustrates a nodal zone of a backbone zone.

FIG. 2 is a block diagram illustrating a topology of a zone of a backbone zone. Zone 1 includes a number of nodes and links. In this particular example, "Zone 1" includes a node 240 (Node 1); a node 250 (Node 2); a node 260 (Node 3); a node 210 (Node 4); a node 220 (Node 5); a node 200 (Node 6); and a node 230 (Node 7). Links interconnect the nodes, and in this particular example, the topology includes a link 205, a link 215, a link 225, a link 235, a link 245, a link 255, a link 265, a link 275, and a link 285. In an embodiment, a link can be define as a logical group of one or more ports that connect two adjacent nodes (e.g., a physical interface). A port is a physical interface. There can be more than one link between adjacent nodes.

Within a zone, nodes can be distinguished by the attributes they possess. In one embodiment, the location of the node can determine the attributes of the node. A master node is defined as the endpoint of a link with numerically lower node ID. A master border node is defined as the end-node of an inter-zone link that is also a source node or proxy source node of one or more virtual paths (VP) that use that inter-zone link. A VP is an end-to-end connection with which is associated certain information such as a path bandwidth, class of service (CoS), quality of service (QoS) level, and the like. An inter-zone VP is one that traverses two or more zones. As described in the previously referenced patent application entitled "A METHOD FOR ROUTING INFORMATION OVER A NETWORK EMPLOYING CENTRALIZED CONTROL," the wavelength routing protocol (WaRP™) protocol describes a master border node as generating a Create Path request when the inter-zone link fails. A slave border node is the end-node of an inter-zone link that is also the destination or proxy destination node of one or more VPs that use that link. An entry border node is a border node that receives the Create Path request from an adjacent zone. An exit border node is a border node that forwards the Create Path request to an adjacent zone. An origin node is the origin of a WaRP™ packet (e.g. Restore Path, Delete Path, and Test Path packets). An origin node is either the source node of the VP or a proxy border node. In the case of an intra-zone failure, an origin border node is a border node that assumes the role of a source node during a path restoration attempt, and is responsible for generating the Restore Path request on behalf of the source node. The ID of the origin border node is carried in the origin field of the Request Path request.

Figure 3:
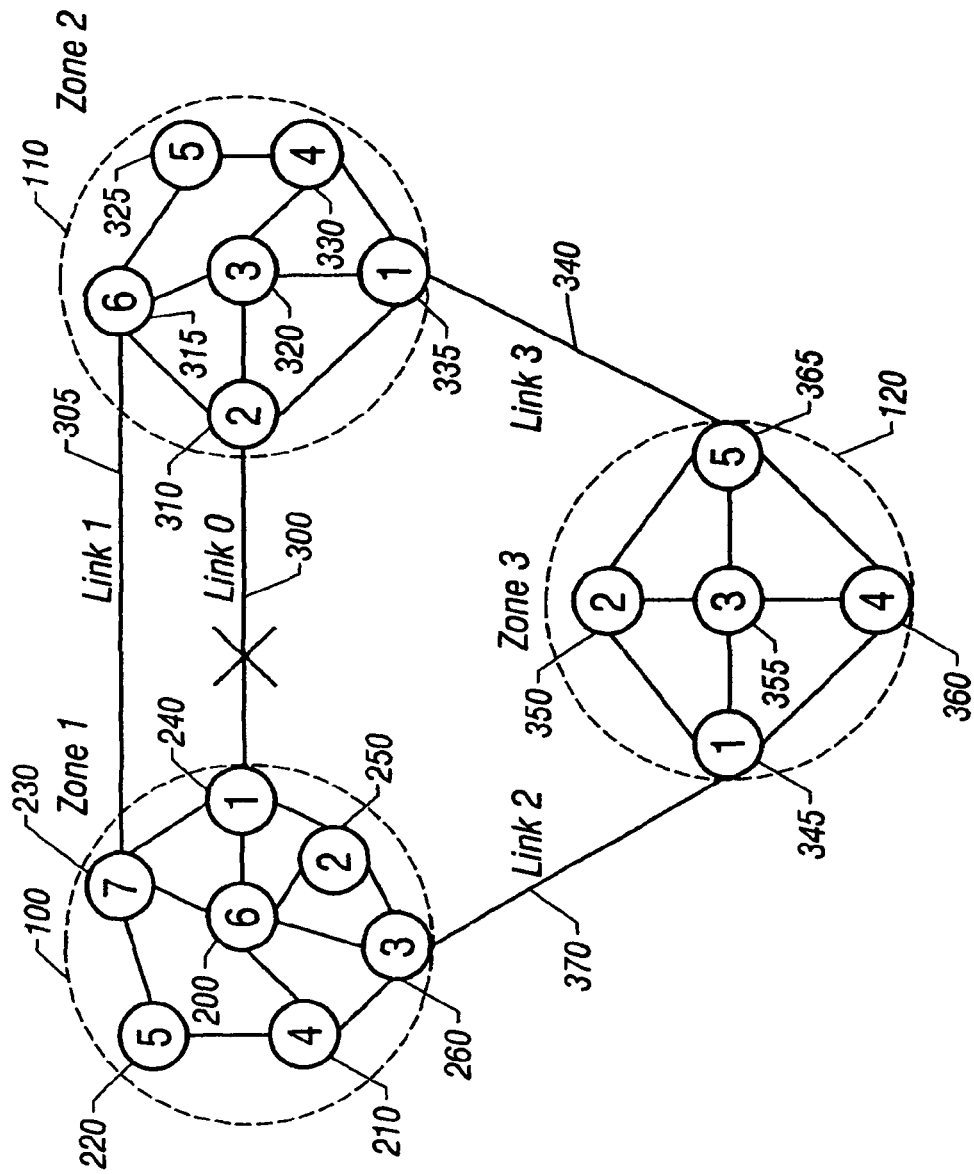
FIG. 3 illustrates inter-zone communication.

FIG. 3 illustrates a topology of inter-zone communication. Zone 100 (Zone 1) 100 is connected to zone 110 (Zone 2) by a link 300 (Link 0). The border node 240 (Node 1) of zone 100 (Zone 1) is connected by link 300 (Link 0) to border node 310 (Node 2) of zone 110 (Zone 2). The following naming convention will henceforth be used to describe a node. The naming convention consists of the zone, followed by a period, and the node that is referred to within the specific zone. Therefore, node 240 (Node 1) of zone 100 (Zone 1) can also be referred to as Node 1.1. Node 310 (Node 2) of zone 110 (Zone 2) can also be referred to as Node 2.2.

In this particular example, inter-zone link "Link 0" 300 fails. When an inter-zone link fails, or one of its two end nodes fail, the WaRP™ protocol uses a combination of broadcast and source-routed packets to reroute traffic around the failure.

In certain implementations, the WaRP™ protocol allows a single inter-zone failure to be restored within 50 milliseconds (ms) or less. In one embodiment, timely restoration (within 50 ms) during a second inter-zone failure can be affected by the WaRP™ protocol algorithm using information contained in the topology database of the backbone zone, or in this example Zone 0, to compute new inter-zone routes for the failed VPs. Source routed packets are used to request and establish the new routes. In other words, no flooding or broadcasting of packets is ever attempted nor allowed between zones, only within zones or intra-zone. One of the two nodes on either end of the failed link that node being a master node computes a shortest path first alternative for each failed route, and places the newly calculated routes into a Create Path packet, and sends the Create Path packet to the next backbone node along the path. Tandem border nodes then use the computed route to forward the packet toward its ultimate destination. Routes within each zone are established using the same flooding mechanism as described earlier. The basic flooding mechanism involves each packet being sent to all active neighbors except the one from which the packet was received.

Intra-zone restoration activities preferably occur in parallel and proceed independently of one another. While routes are established, a second failure along an inter-zone link results in a negative response generated by one of the tandem border nodes. That negative response is propagated all the way to the master border node, and causes the master border node to compute a new route for the VP and retry the operation or link. In most cases, this process increases the restoration time of the VP to over 100 ms (or the time required for 2 attempts). This lengthy restoration time can be avoided, and restoration times limited to 50 ms or less by pre-planning the backbone route for all inter-zone link failures. Only the backbone route, the backbone route being made up entirely of inter-zone links, needs to be pre-planned. The one or more intra-zone sub-paths of the end-to-end route are still established dynamically using the Restore Path packet/request.

The 1+1 restoration method is typically assigned to mission critical data paths with higher CoS. In a 1+1 restoration method, two distinct physical paths are provisioned and assigned to a VP. Each provisioned physical path is preferably completely node and link disjoint, although the 1+1 restoration method described herein can be limited to only a section of a given path. The VP is provisioned by using two separate Add Path requests for two distinct physical paths. The provisioning of the VP is not considered successful unless two distinct physical paths are provisioned and assigned to the VP. One of the two assigned physical paths is designated as the primary path and the other physical path is designated as the secondary path. During the provisioning, each tandem node allocates specific ports at input and output links for each path. For 1+1 restoration scheme, these ports are not shared by any other VP. In case of a path failure, tandem nodes do not release these ports.

After the provisioning of a VP using a 1+1 restoration method, the reserved ports and the bandwidth of the secondary path are not used by any other VP in the network. The secondary path is dedicated to the VP for restoration purposes. The primary path and the secondary path stay active during the data transmission. However, one path is used as the transmission path and the other path is used as standby path in case of a failure.

Restoration times can also be limited by eliminating any possibility of back-to-back inter-zone link failures. One way to deal with inter-zone link failures is to use traditional protection schemes like diverse routing (the use of physically dissimilar cabling and hardware) and self-healing rings (SHR). This is also known as providing redundant paths. Protecting inter-zone links can be justified because inter-zone links make up a very small percentage of the overall fiber capacity. Moreover, in some situations, there is not enough connectivity among zones to make mesh restoration in the backbone zone any more efficient than diverse routing and SHR.

One of the attributes that makes mesh restoration superior to other traditional schemes is mesh restoration's ability to allow for sharing capacity. The amount of capacity sharing, however, is highly dependent on the topology of the network, the richness of its connectivity, and the end-to-end demand requirements. For a sparsely connected network, such as may be the case in a backbone zone, capacity sharing is minimal. For such topologies, where connectivity is limited and a hop-count is small), the additional cost of using traditional restoration methods can be justified (a hop is the path between two network nodes, and the hop-count is the number of hops between a given pair of nodes. For example, a "two hop" route involves three nodes and two links.

SHR provides very fast restoration of failed links by using redundant links between the nodes of each ring. Each ring consists of two rings, a ring supporting information transfer in a "clockwise" direction and a ring supporting information transfer in a "counter-clockwise" direction. The terms "east" and "west" are also commonly used in this regard. Each direction employs its own set of fiber optic cables, with traffic between nodes assigned a certain direction (either clockwise or counter clockwise). If a cable in one of these sub-rings is damaged, the ring "heals" itself by changing the direction of information flow from the direction taken by the information transferred over the failed link to the sub-ring having information flow in the opposite direction.

The detection of such faults and the restoration of information flow thus occur very quickly, on the order of 10 ms for detection, and 50 ms for restoration for most ring implementations. The short restoration time is critical in supporting applications, such as telephone networks, that are sensitive to QoS. Other applications that may be QoS sensitive include systems that require short restoration times to prevent old digital terminals and switches from generating and initiating alarms, such as carrier group alarms. Alarms are undesirable because such alarms usually result in dropped calls, causing users down time and aggravation.

The protection bandwidth can be a user-configurable parameter, attaching a QoS metric to configured connections and links. The QoS parameter allows the amount of required spare capacity to be reduced even further, while maintaining the same quality of service for those connections that need it and, more importantly, can afford such treatment. In other words, high availability is mapped into a cost metric and only made available to users who can justify the cost.

It will be noted that, typically, restoration times that exceed 10 seconds can lead to timeouts at higher protocol layers, while those that exceed one minute can lead to disastrous results for the entire network. However, the price of such quickly-restored information flow is the high bandwidth requirements of such systems. By maintaining completely redundant sub-rings, an SHR topology requires 100% excess bandwidth. As noted, an alternative to the SHR topology is the mesh topology.

Networks based on mesh-type restoration are inherently more capacity-efficient than ring-based designs, mainly because each network link can potentially provide protection for fiber cuts on several different links. By sharing the capacity between links, a network using a mesh topology can provide redundancy for failure restoration at less than 100% of the bandwidth capacity originally required. Such networks are even more efficient when traffic transits several links. Using the described approaches, however, result in restoration times ranging from several minutes to several months.

Once the user has defined the topology of the network, the user can configure one or more connections between nodes. Each configured connection defines a virtual path between the two end points, which are not required to be direct neighbors or even belong to the same zone. Similar to a physical point-to-point connection, the resulting VP has an associated capacity and an operational state.

The two end points of a VP can be designated as having a master/slave relationship. The master node is also referred to herein as the source node of the VP, and the slave node is referred to herein as the destination node. The source node typically assumes recovery responsibilities for the VP and originates Restore Path requests. The destination node waits for a message from the source node informing the destination node of the new path to use for the connection.

The method in which VPs are restored is the same regardless of how backbone routes are obtained. If 1:1 protection is used in the backbone zone, the alternate route is simply the protection channel assigned to the failed span. For description of 1:1 and 1:N protection, see the above-referenced patent application entitled "A METHOD FOR RESTORING A VIRTUAL PATH IN AN OPTICAL NETWORK USING 1+1 PROTECTION.".

When mesh restoration is used, however, the route is computed automatically by running an shortest path first (SPF)

algorithm on the backbone zone to find the shortest path between the two border nodes. The alternate route, regardless of how it is computed, is then placed in the Create Path request and sent to the target node.

Shortest Path First (SPF) Algorithm

Routes can be computed using a QoS-based shortest-path algorithm or the SPF algorithm. The route selection process relies on configured metrics and an up-to-date view of the topology to find the shortest paths between any two nodes. The topology database contains information about all network nodes, their links, and available capacity.

All nodes are assigned globally unique IDs. This gives the user control over the master/slave relationship between nodes. The network detects duplicate IDs when node adjacency is established. All nodes found with a duplicate ID are disabled by the protocol. An appropriate alarm can be generated to provide notification of the problem so that proper action can be taken.

The SPF algorithm uses the following variables:

1—Ready—A queue that holds a list of nodes, or vertices, that need to be processed.

2—Database—The pruned copy of the topology database, which is acquired automatically by the node using the Hello protocol, the Hello protocol is described below. The computing node removes all vertices and or links that do not meet the specified QoS and bandwidth requirements of the route.

3—Neighbors [A]—An array of 'A' neighbors. Each entry contains a pointer to one of the neighbor data structures described below:

In certain embodiments, network nodes use a protocol such as that referred to herein as the Hello Protocol in order to establish and maintain neighbor relationships, and to learn and distribute link-state information throughout the network. The protocol relies on the periodic exchange of bi-directional packets, known as Hello packets, between neighbors. During the adjacency establishment phase of the protocol, which involves the exchange of NIT packets, nodes learn information about their neighbors, such as that listed in Table 1.

TABLE 1

| Parameter | Usage |
|---|---|
| Node ID | Node ID of the sending node, which is preferably, from 8 bits to 32 bits. |
| HelloInterval | How often Hello packets should be sent by the receiving node |
| HelloDeadInterval | The time interval, in seconds, after which the sending node will consider its neighbor dead if a valid Hello packets is not received. |
| LinkCost | Cost of the link between the two neighbors. This may represent distance, delay or any other metric. |
| LinkCapacity | Total link capacity |
| QoS3Capacity | Link capacity reserved for QoS 3 connections |
| QoSnCapacity | Link capacity reserved for QoS 0-2 connections |

Every WaRP™ protocol node is required to establish an adjacency with its immediate neighbors. The adjacencies are used to exchange WaRP™ protocol packets with those neighbors and to determine their operational status. Each adjacency is represented by a neighbor data structure that contains all information needed to establish and maintain the adjacency. Table 2 illustrates a minimum number of fields to establish neighbor data relationship.

TABLE 2

| State | The state of the adjacency |
|---|---|
| NodeID | Node ID of the neighbor |
| InactivityTimer | A one-shot timer whose expiration indicates that no Hello packet has been seen from this neighbor since the last HelloDeadInterval seconds. |
| HelloInterval | This is how often the neighbor wants us to send Hello packets. |
| HelloDeadInterval | This is how long the neighbor wants us to wait before declaring it is dead when it stops sending Hello packets. |
| LinkControlBlocks | A list of all links that exist between the two neighbors. |
| Advertised LSAs | A list of LSAs received from this neighbor |
| LSAsToBeSent | A list of LSAs that need to be sent to this neighbor |

The link state advertisement (LSA) contains a list of the node's neighbors, links, the capacity of those links, the QoS available over the links, one or more costs associated with each of the links, and other pertinent information.

4—Path [N][H]—A two-dimensional array (N rows by H columns, where N is the number of nodes in the network and H is the maximum hop count). Position (n, h) of the array contains a pointer to the following structure illustrated in Table 3.

TABLE 3

| Cost | Cost of the path from R to n |
|---|---|
| NextHop | Next node along the path from R to n |
| PrevHop | Previous node along the path from n to R |

Figure 4:
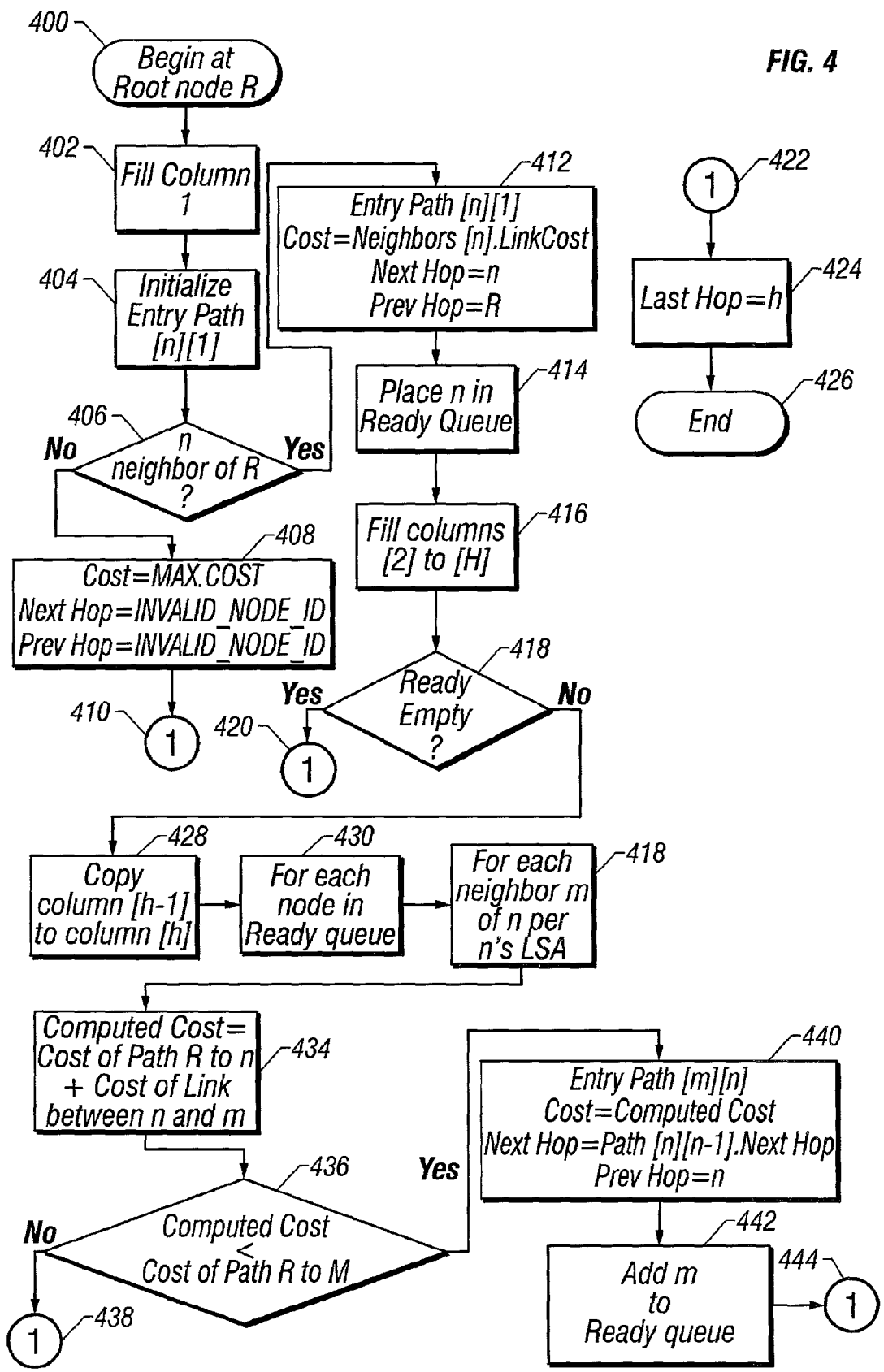
FIG. 4 is a flowchart illustrating setup of the shortest path formula algorithm table.

Now referring to FIG. 4 illustrated is a flowchart that creates the SPF two-dimensional array. The flowchart begins with R, the root node 400. The root node is the node that computes the routes. Initially, column 1 of the array is filled 402. For each node n that is known to R, entry Path[n][1] is initialized 404. A decision is made to determine if n is a neighbor of R 406. If n is not a neighbor of R then the entry Path[n][1] is set to the following values 408:

Cost=MAX_COST
NextHop=INVALID_NODE_ID
PrevHop=INVALID_NODE_ID

The process follows by setting the variable LastHop to equal the column value h 424 and then ending the process 426.

If n is a neighbor of R filling the two-dimensional array proceeds as follows. The entry Path[n][1] is set to the following values 412:

Cost=Neighbors [n].LinkCost
NextHop=n
PrevHop=R

The node n is then placed in the Ready queue 414. The process then continues to fill the remaining columns [2] to [H] 416. A determination is made to see if the Ready queue is empty 418. If the Ready queue is empty, the process follows by setting the variable LastHop to equal the column value h 424 and then ending the process 426.

If the Ready queue is not empty the process continues. The column [h−1] is copied to the current column [h] 428. The process continues for each node that is in the Ready queue 430, and for each neighbor node m of n according to n's LSA. The variable ComputedCost is calculated as the cost of the Path R to n plus the cost of the link between n and m. A determination is then made as to whether ComputedCost is less than the cost of the Path of R to m. If the ComputedCost is not less than the cost of the Path of R to m then the process follows by setting the variable LastHop to equal the column value h 424 and then ending the process 426.

If ComputedCost is less than the cost of the Path of R to m, the following values are set for entry Path[m][n] 440.
Cost=ComputedCost
NextHop=Path[n][n−1].NextHop
PrevHop=n The node m is then added to the Ready queue 442. The variable LastHop is set to equal the column value h 424 and the process is ended 426, if all nodes in the Ready queue are completed 430, and for all neighbor m nodes of n 432.

When the two-dimensional array is filled, for any given hop-count (1 through LastHop), the entry Path[ ][ ] contains the best route from R to all other nodes in the network. To find the shortest hop path from R to n, row n is searched until an entry with a cost not equal to the value of variable MAX_COST is found. To find the least-cost path between R and n, regardless of the hop count, entries 1 through LastHop of row n are scanned, and the entry with the lowest cost is selected.

Figure 5:
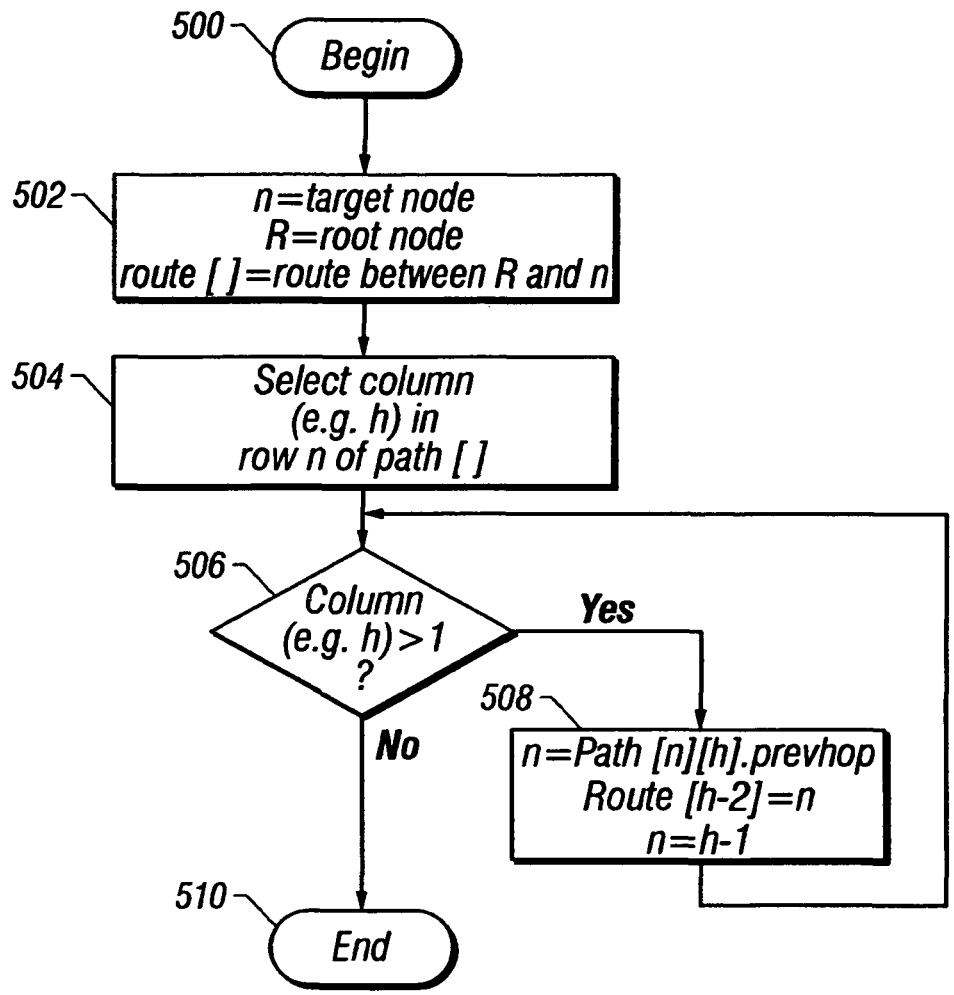
FIG. 5 is a flowchart illustrating how the shortest path formula algorithm looks up the shortest path.

Now referring to FIG. 5, shown is a flow chart that illustrates how to determine the shortest route to a given node. The target node is set to node n, and the root node is set to R; route[ ] is the route between R (root) and n 502. A column is selected from row n of PathH[ ][ ], for example column h is chosen. A determination is made as to whether the column is greater than "1" 506. If the column is not greater than "1" the process is ended 510. If the column is greater than "1" the following values are set 508:
n=Path[n][h].PrevHop
Route[h−2]=n
h=h−1.

Process 508 continues until the column value is not greater than 1.

An alternative embodiment to the above mentioned algorithm replaces the 2-dimensional array with a single column that contains the best path, regardless of hop count, to any given node. The basic algorithm remains the same except setting Route[h−2] to n is eliminated. All references to Path [node] [hop] are replaced with Path[node]. The modified algorithm executes about eight times faster but provides a single route to each destination. The multi-hop result of the original algorithm can be emulated by calling the modified algorithm multiple times, once for each desired route. This requires that certain arcs and vertices be removed from the topology table prior to each call. Otherwise, the SPF algorithm would return the same path every time. Deciding which arcs and/or vertices to remove from the database depends on the objective being achieved. If the intent is to obtain two or more link-disjoint routes, then all arcs present in the first N routes should be disqualified prior to making the (N+1)$^{st}$ call. If the intent, however, is to obtain K distinct routes, then disqualifying one link from each computed route is sufficient to achieve the desired result.

The Create Path packet is used to restore VPs disabled by inter-zone failures. The Create Path packet carries in its body a route that consists of a list of border nodes along the path between the source and destination nodes of the VP. The Create Path packet is generated by one of the two border nodes that share the failed link. The Create Path packet is terminated by the border node of the last zone that the old and new paths have in common.

Now referring back to FIG. 3, the two end-points of the failed inter-zone link, which are border nodes "Node 1.1" 240 and "Node 2.2" 310, detect the failure on "Link 0" 300 and send one or more Link Down indications to all end-nodes affected by the failure. An end-node is any node that terminates a VP within that zone, including proxy source and destination nodes. In this example, the two end nodes are "Node 1.6" 200 and "Node 2.3" 320.

"Node 2.2" 310, a master border node realizes that the failed link has a pre-planned alternate path, so it formats the following Create Path request of Table 4 and sends it to "Node 2.6" 315:

TABLE 4

| Field | Contents |
| --- | --- |
| Origin | 2.2 |
| Target | 2.6 |
| VPID | 0x20060001 |
| PathIndex | 0 |
| Path | 2.6, 1.7 |

When the Create Path request arrives at node "Node 2.6" 315, it simply increments the PathIndex field and forwards the modified request to "Node 1.7" 230, the next node along the path. The Create Path request also initiates path establishment within its zone by sending a Restore Path request to node 2.3, the Destination node of the VP.

Failure Restoration

Once a node has detected a failure on one of its links, either through a local loss of signal defect or a received alarm indication signal, the node scans its VP table looking for entries that have the failed link in their path. When the node finds such an entry, the node releases all link bandwidth used by the VP. Then, if the node happened to be the source node of the VP, or a proxy border node, the node changes its state to "restoring" and places the nodes VP on a list of VPs to be restored. Otherwise if the node is not the source node or a proxy border node the state of the VP is changed to "down," and a timer is started to delete the node from the database. If a corresponding Restore Path request is not received from the origin node within a certain timeout period the timer is started.

The VP list that was created in the previous step is rank-ordered by QoS, ensuring that VPs with a higher QoS are restored first. Each entry in the list contains, among other things, the ID of the VP, Source and Destination nodes of the VP, configured QoS level, and required bandwidth.

When the Create Path request arrives at node 230 (Node 1.7), the last node in the specified path, Node 1.7 sends a Change Target request to node 200 (Node 1.6), node 200 (Node 1.6) being the source node of the VP. "Node 1.7" 230 does not forward the Create Path request since there are no other entries in the path. Upon receiving the Change Target request from node 230 (Node 1.7), node 200 (Node 1.6) formats and sends a Restore Path request to node 230 (Node 1.7).

Once an acceptable instance of the Restore Path request has reached node 230 (Node 1.7) 230, node 230 (Node 1.7) sends a Create Path response to node 315 (Node 2.6). The response, as illustrated in Table 5, contains a list of ports allocated for the VP on the inter-zone link. In this example, node 230 (Node 1.7) allocates port 4 and port 6.

TABLE 5

| Field | Contents |
| --- | --- |
| Origin | 1.7 |
| Target | 2.6 |
| VPID | 0x20060001 |
| PathIndex | 0 |
| Path | 2.6, 1.7 |
| Ports | 4, 6 |

When the positive response reaches node 315 (Node 2.6), the sub-path in "Zone 2" 110 connects to the ports specified in the response. Node 315 (Node 2.6) then forwards the response to Node 310 (Node 2.2). Node 310 (Node 2.2) is the master border node that generated the Create Path request.

Two Hop Inter-Zone Alternate Path

In this example, the preplanned alternate path passes through a transit zone. The transit zone 120 is also referred to as Zone 3. A transit zone is defined as a zone that contains one or more tandem nodes used by a particular VP, with the transit node neither originating nor terminating that VP. The first two steps are the same as described in the previous example, except for the path shown in the Create Path message. The alternate path in this example is:

Node 335 (Node 2.1)→Node 365 (Node 3.5)→Node 345 (Node 3.1)→Node 260 (Node 1.3)

When the Create Path message arrives at a transit zone 120 (Zone 3), the entry border node 365 (Node 3.5) forwards the request to the exit border node 345 (Node 3.1). When the Create Path message reaches node 345 (Node 3.1), path establishment is initiated within the zone by sending a Restore Path request to node 365 (Node 3.5). Node 345 (Node 3.1) forwards the Create Path request to node 260 (Node 1.3), the next node along the specified path. When the message finally reaches node 260 (Node 1.3) in the target zone, node 200 (Node 1.6) receives a Change Target request. Node 200 (Node 1.6) being the source node of the VP. If zone 100 (Zone 1) were a transit zone, the Change Target request would be sent to a proxy source node instead.

The Change Target request triggers node 200 (Node 1.6) to send a Restore Path request to node 260 (Node 1.3). When an acceptable instance of the Restore Path request arrives at node 260 (Node 1.3), node 260 (Node 1.3) formats and sends a Create Path response to node 345 (Node 3.1). The response, illustrated in Table 6, contains a list of ports allocated for the path on link 370 (Link 2). In this particular example, link 370 (Link 2) includes a port 3 and a port 6.

TABLE 6

| Field | Contents |
|---|---|
| Origin | 1.3 |
| Target | 3.1 |
| VPID | 0x20060001 |
| PathIndex | 2 |
| Path | 2.1, 3.5, 3.1, 1.3 |
| Ports | 3, 6 |

When the Create Path response reaches node 345 (Node 3.1), the create path response allocates the specified ports on link 370 (Link 2) and forwards a modified version of the response to node 3.5 (Node 3.5), as illustrated in Table 7.

TABLE 7

| Field | Contents |
|---|---|
| Origin | 3.1 |
| Target | 3.5 |
| VPID | 0x20060001 |
| PathIndex | 1 |
| Path | 2.1, 3.5, 3.1, 1.3 |
| Ports | Not used on intra-zone links |

Node 365 (Node 3.5), upon receiving the above response, allocates the required number of ports on "Link 3" 340, appends the required number of ports to the response, and sends the response to node 335 (Node 2.1), as illustrated in Table 8.

TABLE 8

| Field | Contents |
|---|---|
| Origin | 3.5 |
| Target | 2.1 |
| VPID | 0x20060001 |
| PathIndex | 0 |
| Path | 2.1, 3.5, 3.1, 1.3 |
| Ports | 7, 9 |

Node 335 (Node 2.1), upon receiving the response from node 365 (Node 3.5), allocates the specified port 7 and port 9 on link 340 (Link 3) and connects them to the sub-path in "Zone 2" 110. "Node 2.1" 335 also forwards the response to "Node 2.2" 310 which is the master border node, and thus completing the loop.

An Example Computing and Network Environment

Figure 6:
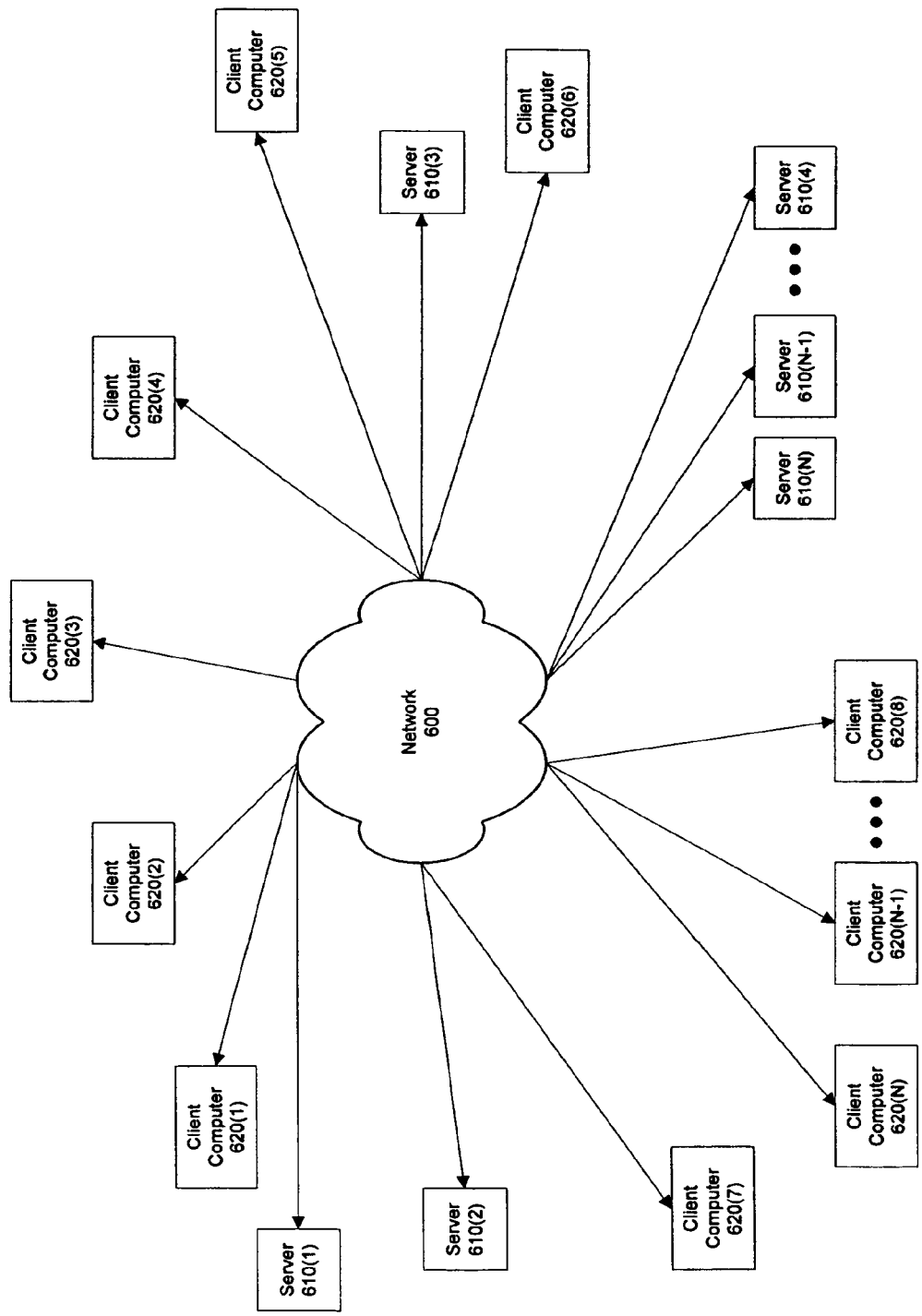
FIG. 6 is a block diagram illustrating a network environment in which embodiments of the present invention may be practiced.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)-(N) that are accessible by client computers 620(1)-(N). Communication between client computers 620(1)-(N) and servers 610(1)-(N) typically occurs over a publicly accessible network, such as a public switched telephone network (PSTN), a DSL connection, a cable modem connection or large bandwidth trunks (e.g., communications channels providing T1 or OC3 service). Client computers 620(1)-(N) access servers 610(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)-(N).

One or more of client computers 620(1)-(N) and/or one or more of servers 610(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 620(1)-(N) is shown in detail in FIG. 6.

Figure 7:
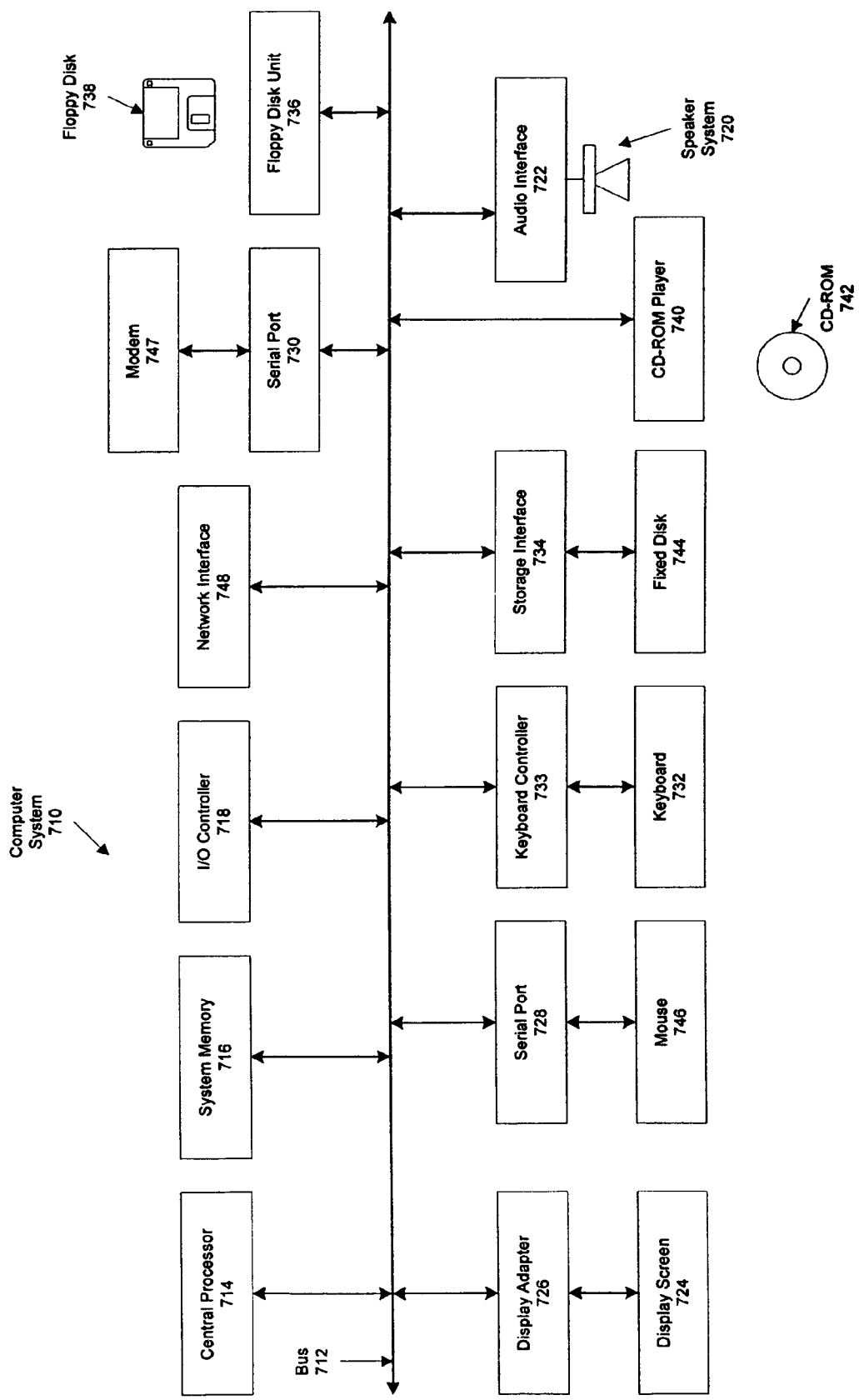
FIG. 7 is a block diagram illustrating a computer system suitable for implementing embodiments of the present invention.

FIG. 7 depicts a block diagram of a computer system 710 suitable for implementing the present invention, and example of one or more of client computers 620(1)-(N). Computer system 710 includes a bus 712 which interconnects major subsystems of computer system 710 such as a central processor 714, a system memory 716 (typically RAM, but which may also include ROM, flash RAM, or the like), an input/ output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. The operating system provided on computer system 710 may be MS-DOS®, MS-WINDOWS®, OS/2®, UNIX®, Linux® or other known operating system. Computer system 710 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 710). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 8:
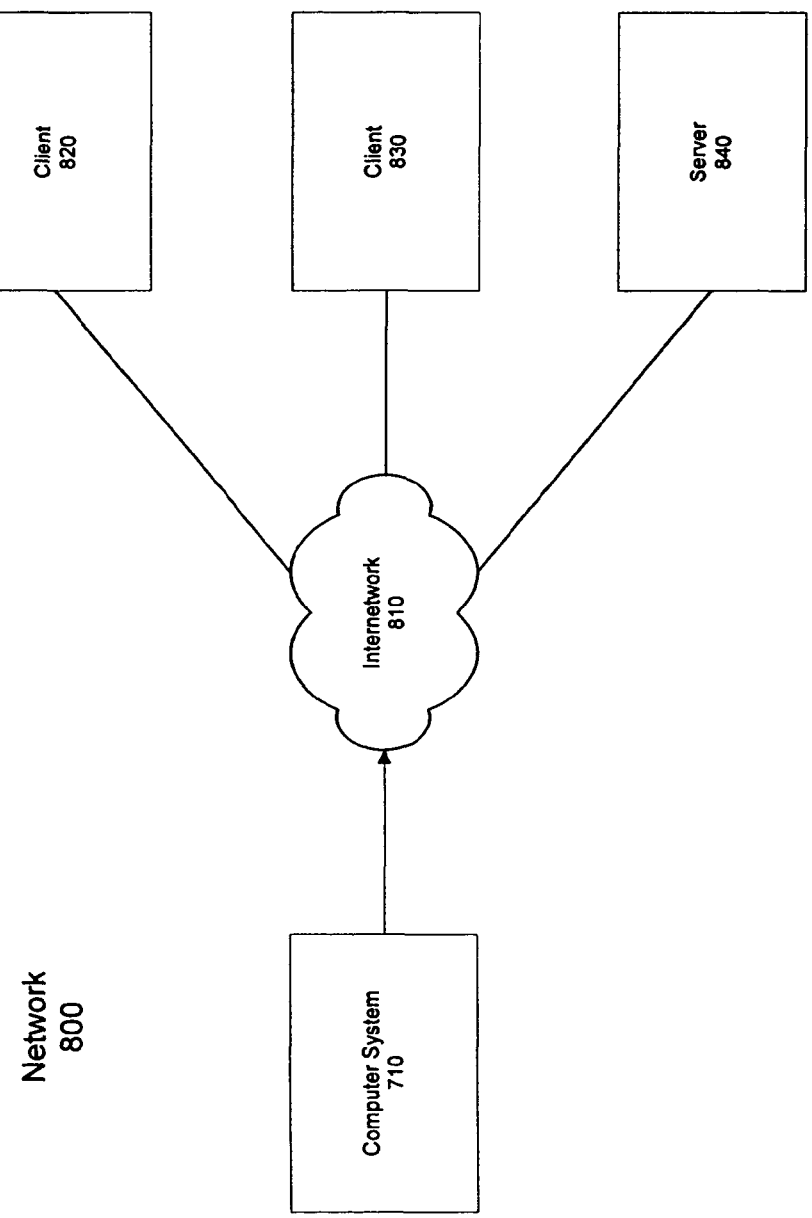
FIG. 8 is a block diagram illustrating the interconnection of the computer system of FIG. 7 to client and host systems.

FIG. 8 is a block diagram depicting a network 800 in which computer system 710 is coupled to an internetwork 810, which is coupled, in turn, to client systems 820 and 830, as well as a server 840. Internetwork 810 (e.g., the Internet) is also capable of coupling client systems 820 and 830, and server 840 to one another. With reference to computer system 710, modem 847, network interface 848 or some other method can be used to provide connectivity from computer system 810 to internetwork 810. Computer system 710, client system 820 and client system 830 are able to access information on server 840 using, for example, a web browser (not shown). Such a web browser allows computer system 710, as well as client systems 820 and 830, to access data on server 840 representing the pages of a website hosted on server 840. Protocols for exchanging data via the Internet are well known to those skilled in the art. Although FIG. 8 depicts the use of the Internet for exchanging data, the present invention is not limited to the Internet or any particular network-based environment.

Referring to FIGS. 6, 7 and 8, a browser running on computer system 710 employs a TCP/IP connection to pass a request to server 840, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Although the present invention has been described in connection with several embodiments, the invention is not intended to be limited to the specific forms set forth herein, but on the contrary, it is intended to cover such alternatives, modifications, and equivalents as can be reasonably included within the scope of the invention as defined by the appended claims.

What is claimed is:

1. A method comprising:
   establishing a virtual path over a first route in a backbone zone, wherein
      the backbone zone comprises a plurality of zones coupled to one another by a plurality of inter-zone links,
      the plurality of zones comprises a source zone and a destination zone, and
      the first route comprises at least one inter-zone link between a first border node of the source zone and a second border node of the destination zone;
   identifying a pre-planned alternative route in the backbone zone, wherein
      the pre-planned alternative route is between the first border node of the source zone and the second border node of the destination zone, and
      the pre-planned alternative route is automatically determined using a shortest path first (SPF) algorithm prior to detection of a first inter-zone link failure in the first route;
   detecting the first inter-zone link failure in the first route;
   establishing the virtual path over the pre-planned alternative route, in response to detection of the first inter-zone link failure comprising
      releasing link bandwidth used by the virtual path, and
      restoring the virtual path if the first inter-zone link failure indicates failure of the first border node of the source zone;
   detecting a second inter-zone link failure in the first route;
   configuring the pre-planned alternative route to pass through a transit zone upon detecting the second inter-zone link failure, wherein
      the transit zone comprises one or more tandem nodes used by the virtual path, and
      the tandem node neither originates or terminates the virtual path; and
   providing communication between the destination zone and the source zone via the pre-planned alternative route.

2. The method of claim 1, wherein:
   the first route meets class of service requirements between the source zone and the destination zone; and
   the pre-planned alternative route meets the class of service requirements between the source zone and the destination zone.

3. The method of claim 2, further comprising:
   requesting one or more new intra-zone paths to be established within a zone that is coupled to an inter-zone link of the pre-planned alternative route, wherein
      the one or more new intra-zone paths meet the class of service requirements between the source zone and the destination zone.

4. The method of claim 2, further comprising:
   establishing one or more new intra-zone paths within a zone that is coupled to an inter-zone link of the pre-planned alternative route, wherein
      the one or more new intra-zone paths meet the class of service requirements between the source zone and the destination zone.

5. The method of claim 1, further comprising:
   routing the pre-planned alternative route through a transit zone, wherein
      the plurality of zones comprises the transit zone, and
      the transit zone is distinct from the source zone and the destination zone.

6. The method of claim 1, further comprising:
   requesting one or more new intra-zone paths to be established within a zone that is coupled to an inter-zone link of the pre-planned alternative route.

7. The method of claim 1, further comprising:
   establishing one or more new intra-zone paths within a zone that is coupled to an inter-zone link of the pre-planned alternative route.

8. The method of claim 1, wherein
   the source zone executes a first copy of a topology distribution algorithm,
   the destination zone executes a second copy of the topology distribution algorithm,
   the first copy of the topology distribution algorithm lacks topology information for the destination zone, and
   the second copy of the topology distribution algorithm lacks topology information for the source zone.

9. The method of claim 8, further comprising:
   routing the pre-planned alternative route through a transit zone wherein
      the transit zone executes a third copy of the topology distribution algorithm,
      the third copy of the topology distribution algorithm lacks topology information for the source zone,
      the third copy of the topology distribution algorithm lacks topology information for the destination zone, and
      the routing the pre-planned alternative route through the transit zone is based at least in part on the third copy of the topology distribution algorithm.

10. The method of claim 1, further comprising
    computing the first route in the backbone zone between the source zone and the destination zone, wherein
       the first route is computed using a topology database that comprises information about the plurality of inter-zone links;
    disqualifying the at least one inter-zone link of the first route from a copy of the topology database to produce a pruned topology database; and
    computing a second route in the backbone zone between the source zone and the destination zone, wherein
       the second route is computed using the pruned topology database, and
       the second route is assigned as the pre-planned alternative route for the first route.

11. The method of claim 10, wherein
    the computing the first route comprises
       generating a first route cost data set using the topology database, wherein
          the first route is computed using the first route cost data set; and
    the computing the second route comprises
       generating a second route cost data set using the pruned topology database, wherein the second route is computed using the second route cost data set, and the second route is link-disjoint from the first route.

12. The method of claim 10, wherein the first route and the second route are computed using the shortest path first (SPF) algorithm.

13. The method of claim 1, wherein the inter-zone link failure is detected by the first border node, and the first border node initiates the establishing the virtual path over the pre-planned alternative route, in response to detection of the inter-zone link failure.

14. The method of claim 13, wherein the SPF algorithm calculates at least one of a minimum-cost route, or a minimum-hop route.

15. The method of claim 13, wherein the SPF algorithm calculates a route that meets a quality of service (QoS).

16. The method of claim 13, wherein the first route and the second route are best-effort routes.

17. The method of claim 1, wherein the establishing the virtual path over the pre-planned alternative route comprises informing a third border node of the pre-planned alternative route, wherein the third border node is coupled to an inter-zone link of the pre-planned alternative route, the informing comprises transmitting a path creation message from the first border node to the third border node, and the path creation message comprises the pre-planned alternative route.

18. The method of claim 17, wherein the first border node and the third border node are in a same zone of the plurality of zones.

19. The method of claim 17, wherein the first border node and the third border node are in different zones of the plurality of zones.

20. A network element comprising:

a processor configured to establish a virtual path over a first route in a backbone zone, wherein the backbone zone comprises a plurality of zones coupled to one another by a plurality of inter-zone links, the plurality of zones comprises a source zone and a destination zone, and the first route comprises at least one inter-zone link between a first border node of the source zone and a second border node of the destination zone;

identify a pre-planned alternative route in the backbone zone, wherein the pre-planned alternative route is between the first border node of the source zone and the second border node of the destination zone, and the pre-planned alternative route is automatically determined using a shortest path first (SFP) algorithm, prior to detection of a first inter-zone link failure in the first route;

detect the first inter-zone link failure in the first route;

establish the virtual path over the pre-planned alternative route, in response to detection of the first inter-zone link failure comprising releasing link bandwidth used by the virtual path, and restoring the virtual path if the first inter-zone link failure indicates failure of the first border node of the source zone;

detect a second inter-zone link failure in the first route;

configure the pre-planned alternative route to pass through a transit zone upon detecting the second inter-zone link failure, wherein the transit zone comprises one or more tandem nodes used by the virtual path, and the tandem node neither originates or terminates the virtual path; and provide communication between the destination zone and the source zone via the pre-planned alternative route.

21. The network element of claim 20, wherein the processor is configured to:

route the pre-planned alternative route through a transit zone, wherein the plurality of zones comprises the transit zone, and the transit zone is distinct from the source zone and the destination zone.

22. The network element of claim 20, wherein the processor is configured to:

request one or more new intra-zone paths to be established within a zone that is coupled to an inter-zone link of the pre-planned alternative route.

23. The network element of claim 20, wherein the processor is configured to:

establish one or more new intra-zone paths within a zone that is coupled to an inter-zone link of the pre-planned alternative route.

24. The network element of claim 20, wherein:

the first route meets class of service requirements between the source zone and the destination zone; and the pre-planned alternative route meets the class of service requirements between the source zone and the destination zone.

25. The network element of claim 24, wherein the processor is configured to:

request one or more new intra-zone paths to be established within a zone that is coupled to an inter-zone link of the pre-planned alternative route, wherein the one or more new intra-zone paths meet the class of service requirements between the source zone and the destination zone.

26. The network element of claim 24, wherein the processor is configured to:

establish one or more new intra-zone paths within a zone that is coupled to an inter-zone link of the pre-planned alternative route, wherein the one or more new intra-zone paths meet the class of service requirements between the source zone and the destination zone.

27. A system comprising:

means for establishing a virtual path over a first route in a backbone zone, wherein the backbone zone comprises a plurality of zones coupled to one another by a plurality of inter-zone links, the plurality of zones comprises a source zone and a destination zone, and the first route comprises at least one inter-zone link between a first border node of the source zone and a second border node of the destination zone;

means for identifying a pre-planned alternative route in the backbone zone, wherein the pre-planned alternative route is between the first border node of the source zone and the second border node of the destination zone, and the pre-planned alternative route is automatically determined using a shortest path first (SFP) algorithm, prior to detection of a first inter-zone link failure in the first route;
means for detecting the first inter-zone link failure in the first route;
means for establishing the virtual path over the pre-planned alternative route, in response to detection of the first inter-zone link failure comprising
releasing link bandwidth used by the virtual path, and
restoring the virtual path if the first inter-zone link failure indicates failure of the first border node of the source zone;
means for detecting a second inter-zone link failure in the first route;
means for configuring the pre-planned alternative route to pass through a transit zone upon detecting the second inter-zone link failure in the first route, wherein
the transit zone comprises one or more tandem nodes used by the virtual path, and
the tandem node neither originates or terminates the virtual path; and
means for providing communication between the destination zone and the source zone via the pre-planned alternative route.

28. The system of claim 27, comprising:
means for routing the pre-planned alternative route through a transit zone, wherein
the plurality of zones comprises the transit zone, and
the transit zone is distinct from the source zone and the destination zone.

29. The system of claim 27, comprising:
means for requesting one or more new intra-zone paths to be established within a zone that is coupled to an inter-zone link of the pre-planned alternative route.

30. The system of claim 27, comprising:
means for establishing one or more new intra-zone paths within a zone that is coupled to an inter-zone link of the pre-planned alternative route.

31. The system of claim 27, wherein:
the first route meets class of service requirements between the source zone and the destination zone; and
the pre-planned alternative route meets the class of service requirements between the source zone and the destination zone.

32. The system of claim 31, comprising:
means for requesting one or more new intra-zone paths to be established within a zone that is coupled to an inter-zone link of the pre-planned alternative route, wherein
the one or more new intra-zone paths meet the class of service requirements between the source zone and the destination zone.

33. The system of claim 31, comprising:
means for establishing one or more new intra-zone paths within a zone that is coupled to an inter-zone link of the pre-planned alternative route, wherein
the one or more new intra-zone paths meet the class of service requirements between the source zone and the destination zone.

34. A non-transitory computer-readable storage medium having instructions encoded therein, wherein the instructions are executable by a processor to perform acts comprising:
establishing a virtual path over a first route in a backbone zone, wherein
the backbone zone comprises a plurality of zones coupled to one another by a plurality of inter-zone links,
the plurality of zones comprises a source zone and a destination zone, and
the first route comprises at least one inter-zone link between a first border node of the source zone and a second border node of the destination zone;
identifying a pre-planned alternative route in the backbone zone, wherein
the pre-planned alternative route is between the first border node of the source zone and the second border node of the destination zone, and
the pre-planned alternative route is automatically determined using a shortest path first (SFP) algorithm, prior to detection of a first inter-zone link failure in the first route;
detecting the first inter-zone link failure in the first route;
establishing the virtual path over the pre-planned alternative route, in response to detection of the first inter-zone link failure comprising
releasing link bandwidth used by the virtual path, and
restoring the virtual path if the first inter-zone link failure indicates failure of the first border node of the source zone;
detecting a second inter-zone link failure in the first route;
configuring the pre-planned alternative route to pass through a transit zone upon detecting the second inter-zone link failure in the first route, wherein
the transit zone comprises one or more tandem nodes used by the virtual path, and
the tandem node neither originates or terminates the virtual path; and
providing communication between the destination zone and the source zone via the pre-planned alternative route.

35. The computer-readable storage medium of claim 34, wherein the instructions are executable by the processor to perform acts comprising:
routing the pre-planned alternative route through a transit zone, wherein
the plurality of zones comprises the transit zone, and
the transit zone is distinct from the source zone and the destination zone.

36. The computer-readable storage medium of claim 34, wherein the instructions are executable by the processor to perform acts comprising:
requesting one or more new intra-zone paths to be established within a zone that is coupled to an inter-zone link of the pre-planned alternative route.

37. The computer-readable storage medium of claim 34, wherein the instructions are executable by the processor to perform acts comprising:
establishing one or more new intra-zone paths within a zone that is coupled to an inter-zone link of the pre-planned alternative route.

38. The computer-readable storage medium of claim 34, wherein:
the first route meets class of service requirements between the source zone and the destination zone; and
the pre-planned alternative route meets the class of service requirements between the source zone and the destination zone.

39. The computer-readable storage medium of claim 38, wherein the instructions are executable by the processor to perform acts comprising:
requesting one or more new intra-zone paths to be established within a zone that is coupled to an inter-zone link of the pre-planned alternative route, wherein the one or more new intra-zone paths meet the class of service requirements between the source zone and the destination zone.

40. The computer-readable storage medium of claim 38, wherein the instructions are executable by the processor to perform acts comprising:

establishing one or more new intra-zone paths within a zone that is coupled to an inter-zone link of the pre-planned alternative route, wherein the one or more new intra-zone paths meet the class of service requirements between the source zone and the destination zone.

\* \* \* \* \*